No. 867,472. PATENTED OCT. 1, 1907.
J. BRENZINGER.
CAN HEADING MACHINE.
APPLICATION FILED FEB. 16, 1903.

6 SHEETS—SHEET 1.

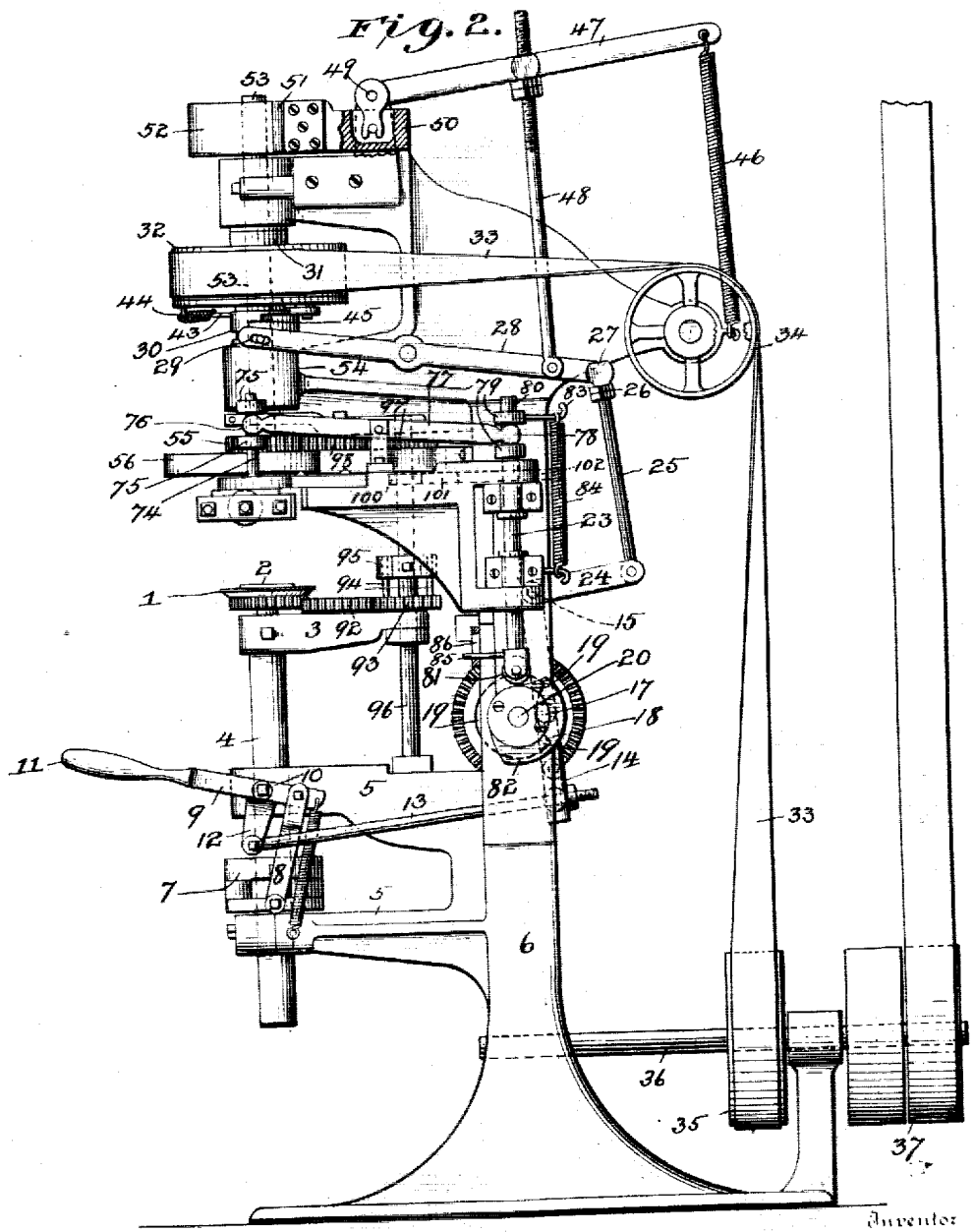

No. 867,472. PATENTED OCT. 1, 1907.
J. BRENZINGER.
CAN HEADING MACHINE.
APPLICATION FILED FEB. 16, 1903.
6 SHEETS—SHEET 3.
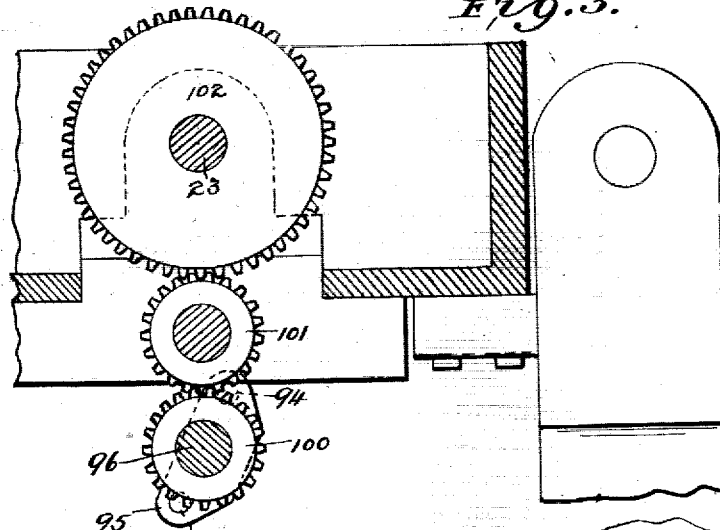
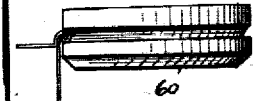
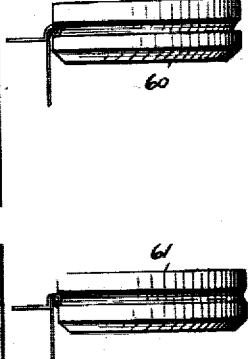
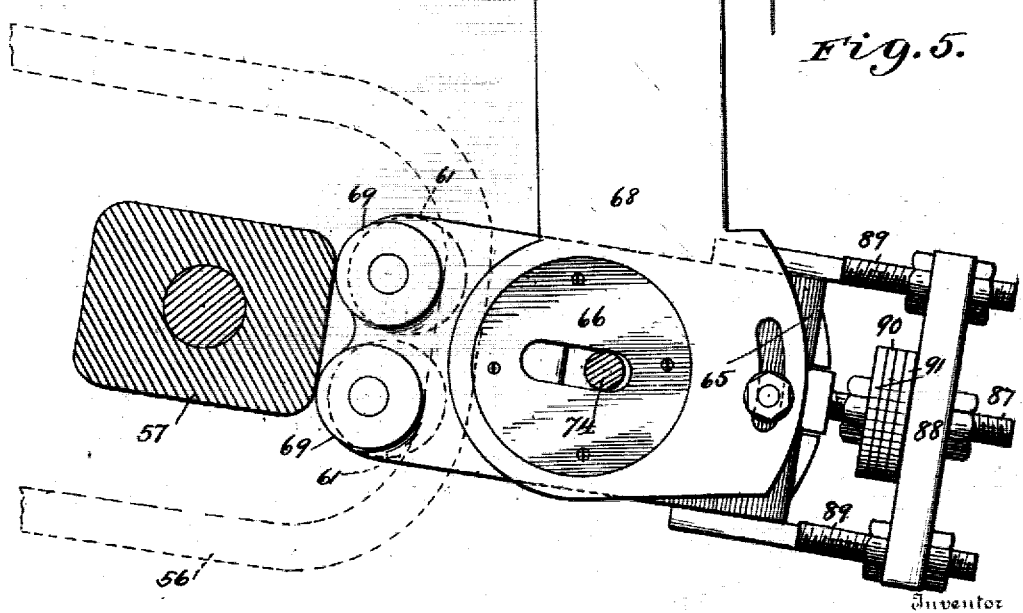
Witnesses
Jas. H. Blackwood
Lance G. Ogden
Inventor
Julius Brenzinger
W. H. Doolittle Son
Attorneys No. 867,472. PATENTED OCT. 1, 1907.
J. BRENZINGER.
CAN HEADING MACHINE.
APPLICATION FILED FEB. 16, 1903.

6 SHEETS—SHEET 4.

No. 867,472.

PATENTED OCT. 1, 1907.

J. BRENZINGER.
CAN HEADING MACHINE.
APPLICATION FILED FEB. 16, 1903.

6 SHEETS—SHEET 5.

Inventor
Julius Brenzinger

Witnesses

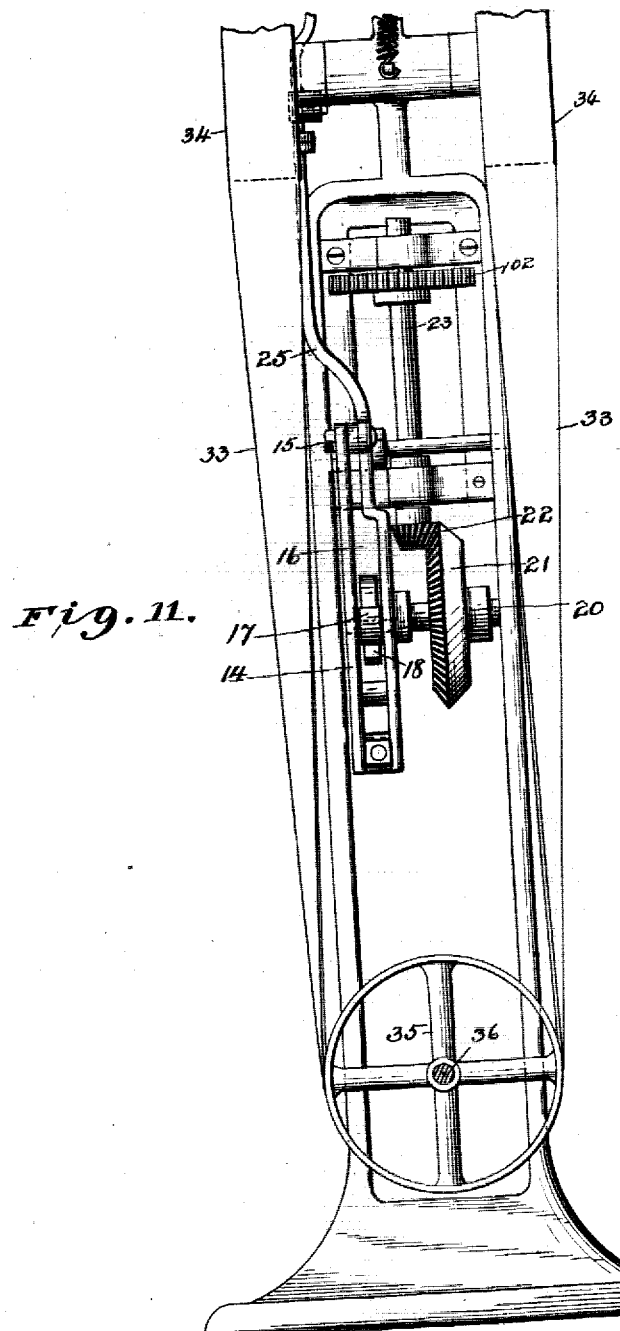

UNITED STATES PATENT OFFICE.

JULIUS BRENZINGER, OF NEW YORK, N. Y., ASSIGNOR TO THE MAX AMS MACHINE COMPANY, OF NEW YORK, N. Y., A CORPORATION OF NEW YORK.

CAN-HEADING MACHINE.

No. 867,472.

Specification of Letters Patent.

Patented Oct. 1, 1907.

Application filed February 16, 1903. Serial No. 143,620.

*To all whom it may concern:*

Be it known that I, JULIUS BRENZINGER, a subject of the Emperor of Germany, residing at New York, in the county of New York and State of New York, have invented certain new and useful Improvements in Can-Heading Machines, of which the following is a specification.

My invention relates to can heading machines and more particularly to double-seaming machines, and its object is to provide a machine in which greater rapidity of operation with the same power as that employed by other machines of this class, is obtained, and in which the seaming rollers are carried by a pattern following carriage of simple movement and strong construction.

My invention relates particularly to machines for heading square and irregularly shaped cans.

To this end my invention comprises the elements and combinations particularly hereinafter described and pointed out in the claims.

Figure 1:
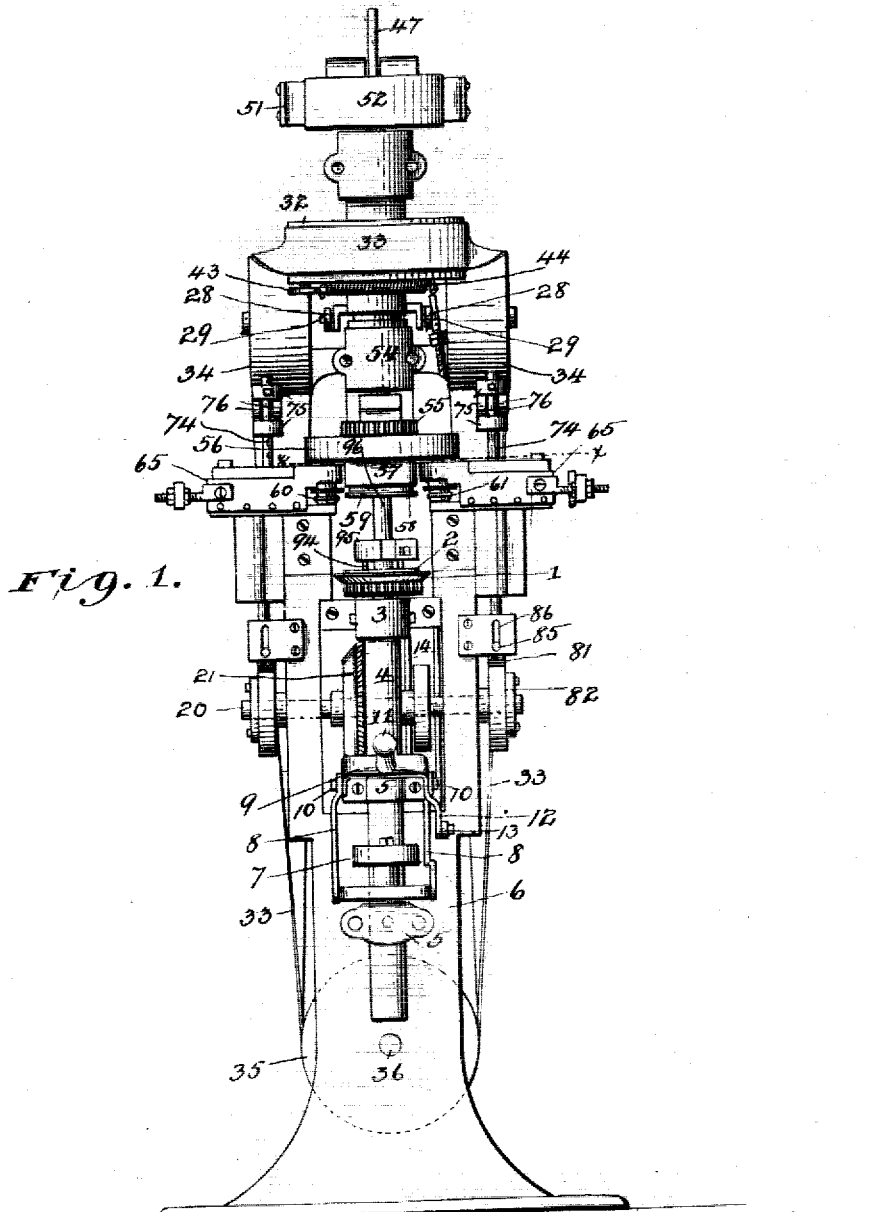
Figure 6:
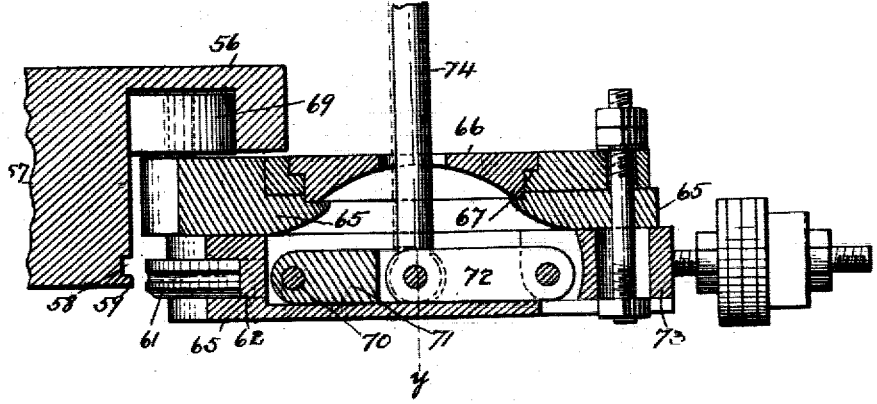
Figure 7:
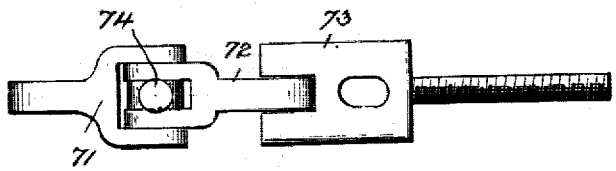
Figure 8:
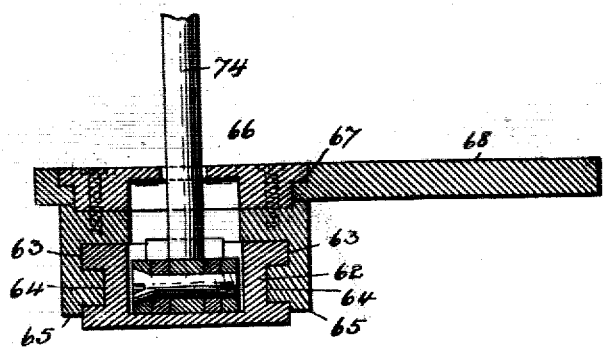
Figure 9:
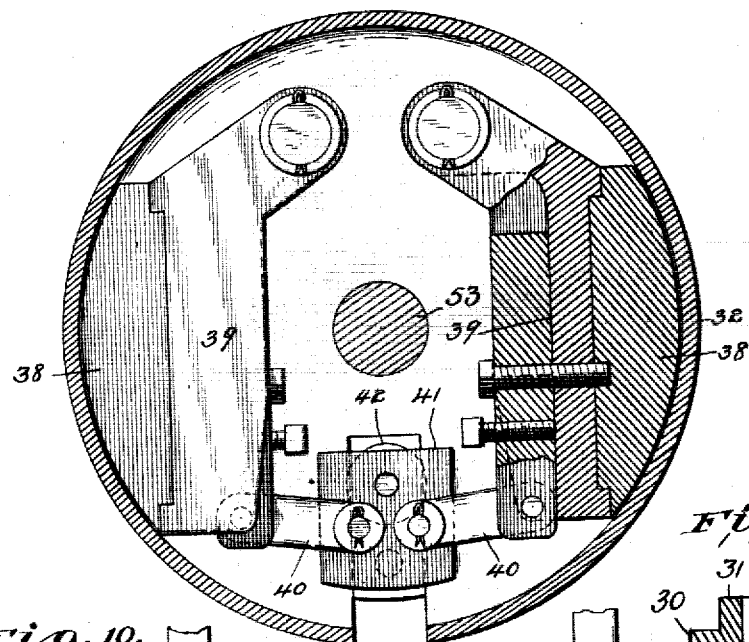
Figure 12:
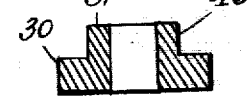
Figure 10:
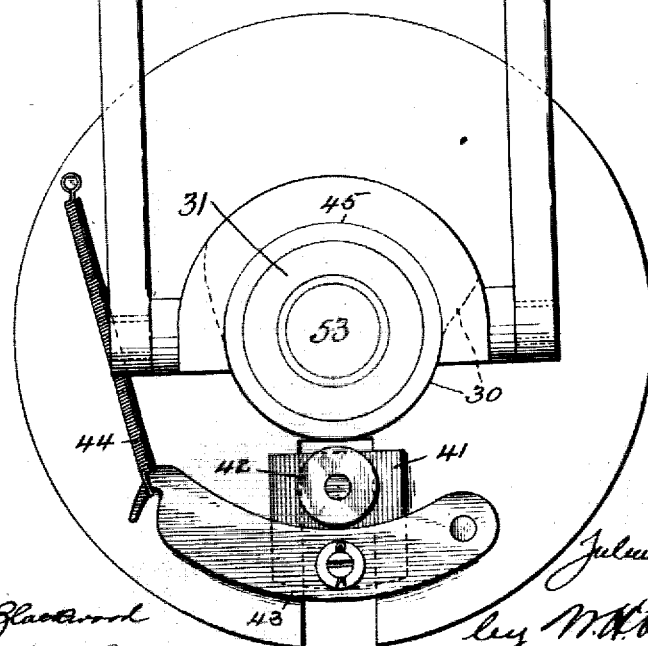

In its preferred embodiment my invention is illustrated in the accompanying drawings, in which Figure 1 is a front view in elevation of the machine; Fig. 2, a side view; Fig. 3, a horizontal section on line $x$—$x$ of Fig. 1; Fig. 4, a detail view of the forming roller and can seam; Fig. 5, a similar view of the locking roller; Fig. 6, a vertical section of the roller supporting means; Fig. 7, a detail plan of the roller-slide; Fig. 8, a transverse vertical section in line $y$—$y$ of Fig. 6; Fig. 9, a horizontal section of the clutch; Fig. 10, a section of clutch operating means, and Fig. 11, a rear detail view in elevation showing the can locking and controlling mechanism and Fig. 12, a detail vertical section on reduced scale of clutch-cam.

Referring to the drawings, 1 is the table on which a can to be headed is placed. This table is provided with a raised can-holding plate 2 on its upper surface to receive the end of a can. The table is swiveled in a horizontal frame 3 fixed at the upper end of a vertically slidable shaft 4 mounted in arms 5 extending from the main frame 6. To this shaft 4 is fixed between the arms 5 a frame 7, to which is connected links 8, one on each side of the shaft. The upper ends of links 8 are pivoted to the inner ends of a forked lever 9 pivoted at 10 to the upper one of the arms 5, and having an operating handle 11 whereby the frame 7, shaft 4 and table 1 are raised when the handle is depressed so as to present the can in proper position for the heading operation.

Pivoted to the end of an arm 12 depending from the forked lever 9 is a rod 13 secured at its rear end to a swinging frame 14 pivotally hung on a pin 15 fixed in the main frame. See Figs. 2 and 11. This swinging frame 14 has a slot 16 in which is journaled a roller 17, adapted to engage a recess 18 in a roller or cam 19 mounted on a shaft 20 journaled in the frame, whereby when the roller 17 falls into said recess the clutch mechanism connecting with said frame is released and the machine is stopped. The shaft 20 is provided with a beveled gear wheel 21 driven by a miter wheel 22 on a vertical shaft 23 connected with the driving mechanism as hereinafter described.

To the upper end of rocking frame 14 is fixed an arm 24 to which is pivoted the lower end of a rod 25 having its upper part provided with an adjustable nut 26 adapted to bear against a collar 27 extending from the end of a lever 28 pivoted by a pin and slot connection 29 to a non-rotating cam 30 mounted to slide vertically on a shaft 31 carrying a lower section of a main driving pulley whose upper part 32 is adapted to be connected to the lower section by a friction clutch and around the periphery of which upper section is run a main driving belt 33 running over pulleys 34 and over driving pulley 35 on shaft 36 which is provided with pulleys 37 adapted to be connected with any suitable driving belt.

The clutch mechanism (see Figs. 9 and 10) comprises shoes 38 secured to hinged arms 39 to which are pivoted toggle-levers 40 pivoted at their opposite ends to a slide 41 having a roller 42 which engages and rides upon cam 30 whereby the toggle-levers are actuated by the slide to draw the clutch shoes away from the inner periphery of pulley section 32, and which roller is also engaged and pressed by an arm 43 pivoted to the under surface of the pulley section and having its free end attached to a coiled spring 44 whereby the slide and its toggle arms are forced back so as to carry outward the brake shoes against the inner surface of the pulley and connect the latter with the driving shafts. As the roller 42 is revolved with lower pulley section by its bearing on the high part of the cam, these shoes will be held away from the pulley section 32 and when the low part of cam is reached the roller will be withdrawn and the clutch shoes applied. The upper edge portion of the cam has a plain perimeter 45, whereby the roller will not contact with the cam except when the latter is raised which is effected by a return spring 46 secured at one end to the main frame work and at the other end to the end of a rocking lever 47.

The levers 47 and 28 are connected by a rod 48 pivoted to each lever. By this connection both levers are returned by spring 46. The lever 47 is pivoted at 49 to the frame and provided with a forked end engaging a pin carried by a slide piece 50 to which is secured a brake-shoe 51 adapted to make contact with a wheel 52 mounted on the upper end of the shaft 31. This brake serves to prevent the further rotation of the clutch and other mechanisms by momentum after the driving connection has been unclutched. The advantage of applying such momentum brake to the clutch shaft is that only the weight of the clutch and other connected seaming parts opposes its momentum to the force of the brake.

Within shaft 31 is fixed a shaft 53, journaled in a bearing 54 extending from the framework and carrying at its lower end a gear wheel 55 to which is fixed a pattern cam 56 having an interior cut out design corresponding to the shape of the can to be headed and provided with a central depending chuck 57. The chuck 57 is provided with a groove 58 and an annular flange 59. With this chuck is adapted to coöperate in order to head the can a pair of forming rolls 60 and an opposite pair of locking rolls 61, each provided with seaming collars and grooves. The rollers are mounted so as to oscillate on a common center and by these means it is possible to provide two forming rollers and two locking rollers, whereby greater rapidity of operation is obtained with the same amount of power.

The rollers of each pair are journaled in a slide 62, whereby they may be carried against the can head into position to roll the seam. The slide 62 is provided with side grooves 63 adapted to engage a rail 64 of rotary carriage 65 having a central disk head 66 adapted to be rotatably seated upon a shoulder 67 of a guide plate 68 which is rigidly fixed to the frame work. By these means the carriage 65 is free to oscillate in the guide plate 68. This oscillating movement is effected and controlled by pattern rollers 69 journaled in the carriage 65 and entering and bearing against the inner wall of the pattern cam 56 so as to be controlled in their movement thereby.

The slide 62 fits into the bottom of carriage 65, and is provided with a pin 70 to which is pivoted the end of a toggle-arm 71, housed in the carriage and slide. The opposite end of the toggle-arm 71 is forked and pivoted to another toggle-arm 72, which has its opposite end pivoted to a block 73 adjustably fixed in the carriage 65.

An actuating toggle-rod 74 is pivoted to the pin joining arms 71 and 72, and by means of the vertical reciprocation of this rod the toggle lever is actuated to slide the seaming rollers in and out. This rod is provided with two collars 75 between which loosely extends the forked end 76 of a rocking lever 77 by which the rod is operated. The other end 78 of the lever is similarly formed and extends between two collars 79 fixed on a vertically sliding rod 80 mounted in the frame and provided at its lower end with a roller 81 bearing on and actuated by a cam 82 fixed on the shaft 20. To a pin 83 extending from the upper one of the two collars 79 is attached the upper end of a coiled return spring 84 having its lower end fastened to a fixed part of the framework. This spring serves to pull down the rod 80 and end of rocking lever 77 after the latter have been actuated by the cam 82. A pin 85 extends from the lower part of rod 80 and engages a slot 86 in a plate extending from the frame whereby any undue upward throw of the rod by the cam is prevented.

The cams 82 are set in advance one of the other in order that the forming rollers may be slid inward against the can seam first and be followed by the locking rollers which will engage the seam as the forming rollers are withdrawn therefrom. Both pairs of rollers are provided with adjusting means to permit their relative distance from the chuck to be regulated as desired to accommodate cans of varying thickness or to take up distances for wear and tear. These adjusting means consist of a contact screw 87 extending from block 73 through a bar 88, supported on said screw and on other screws 89 extending from the carriage 65 which are provided with nuts by which the block 73 and its connected slide 62 may be adjusted in and out relative to the rotary carriage and the chuck.

The adjustment means for the locking rollers slide is provided with a yielding buffer 90, composed of rubber rings or springs, seated between two collars 91 on screw 87 extending from block 73. By means of this buffer the slide and locking rollers will yield to pass any unevenness and the side seam of the can. The buffer is unnecessary for the forming rollers and its slide.

The can supporting table 1 is rotated positively and synchronously with the chuck and to this end its gear wheel is in mesh with a gear 92 on the frame 3, which gear in turn engages wheel 93, also mounted on frame 3, and provided with slidable vertical pins 94 extending through a collar 95 fixed on a vertical shaft 96 which is provided at its upper end with a gear wheel 97 meshing with gear wheel 98 engaging wheel 55 on the pattern cam and fixed to the vertical driving shaft 53. By the gear connection the can supporting table is rotated positively and synchronously with the chuck. The shaft 96 is provided with a pinion 100 engaging an intermediate gear wheel 101 which drives a gear wheel 102 fixed on the upper end of shaft 23 and thus shaft 20 and its slide-actuating cams are driven.

The operation of the machine is as follows:— A can is placed on the table 1 and the handle 11 then depressed which raises frame 7 and shaft 4 and upper frame 3 thus raising the table 1 and also the gears 92, 93. The can head is thus brought against and under the chuck 57. Simultaneously with the raising of the table the depression of the handle will through its frame, push rod 13 backward so as to swing the frame 14 backward and thereby withdraw the roller 17 from the recess in the cam 19 so as to permit shaft 20 to start easily. The frame 14 when rocked moves upward the rod 25 which rocks lever 28 so as to withdraw the cam 30 from the roller 42 and permit the clutch-shoes to be sprung against the pulley 32 and thus clutch the driving pulley to the driving shaft 31. At the same time connecting rod 48 rocks the lever 47 so as to withdraw the brake from the upper wheel 52. The shaft 53 is thereby driven, rotating pattern cam 56 and chuck 57 and rotating table 1 through gears 97, 98, and also cam shaft 20 through the series of connected gears between the shafts 53 and 20. As the shaft 20 rotates the cam 82 of the forming rollers will first be actuated to raise the rod 80 and rock the lever 77 so as to actuate the toggle-arms 71 and 72 and carry the forming rollers in against the can and head seam to coöperate with the chuck. These rollers are held against the seam by the high part of their cam until the flanges of the head and body have been interlocked and bent down, whereupon the low part of the cam is reached by the roller rod and the rollers withdrawn, whereupon the opposing locking rollers are then advanced to position by their cam and the seam locked.

With the ordinary seaming machine in which a single forming roller and a single locking-roller are employed, it is necessary in order to obtain a properly tight joint that the chuck be given at least twelve revolutions. With my invention in which two forming and two locking rollers are employed it is merely necessary to rotate the chuck six times in order to obtain the same result as with the single roller machine, hence greater rapidity of operation with the same power is obtained. The means for enabling the plurality of rollers to be employed lie in the rotary carriage whose rollers follow the contour of the pattern cam and thus carry the seaming rollers around the corners of the can since such rollers will oscillate with the carriage with the center of the latter as a pivot. As soon as the cam of the locking rollers reaches its low part the rollers will be withdrawn from the chuck and the recess 18 on cam 19 will engage roller 17 permitting the frame 14 to swing forward and thereby lowering the rod 25 which permits the return spring 46 to force upward the cam 30 to unclutch the drive pulley 32 and to throw the brake 51 forward, against the wheel 52 so as to stop the chuck and the other driven parts from being carried forward by momentum. At the same time the handle is carried upward by its return spring.
It is clear that various changes in the mechanical details of my invention may be made without departing from the scope thereof.

Having thus described my invention, what I claim is:

1. In a can-heading machine, in combination with a chuck, a plurality of seam-forming rollers, a plurality of seam-locking rollers, a separate oscillatory carriage for each set of rollers, a pattern cam, and pattern-cam rollers for each set of seaming rollers, a sliding support on each carriage on which said rollers are mounted and means to independently and successively move each set of rollers toward and from the chuck, substantially as described.

2. In a can-heading machine, a plurality of seaming rollers, a common slide for said rollers and means for permitting the oscillation of said slide, substantially as described.

3. In a can-heading machine, in combination with a pattern cam, an oscillatory carriage, a plurality of seaming rollers mounted on said carriage, a chuck and means to move said rollers toward and from said chuck, substantially as described.

4. In a can-heading machine, in combination with a chuck, a pattern-cam, a plate extending rigidly from the main frame, a frame having a disk fixed thereon and rotatably mounted on said plate, said frame forming a roller carriage, pattern rollers mounted on said carriage, a seaming roller-support housed in said carriage, one part of said support being slidable and the other part being adjustably fixed thereon, means intermediate said parts to effect a sliding movement of one part toward and from the chuck, said means connected to the adjustable part and means to adjust said part, substantially as described.

5. In a can-heading machine, a seaming roller, a movable member carrying said roller and a toggle-lever for actuating said member, substantially as described.

6. In a can-heading machine a seaming roller, a slide and a toggle-lever for actuating said slide, substantially as described.

7. In a can-heading machine, a seaming roller, a movable member carrying said roller, a toggle-lever for actuating said member and a cam for operating said toggle-lever, substantially as described.

8. In a can-heading machine, a seaming roller, a movable member carrying said roller, a toggle-lever for actuating said member, a cam for operating said toggle-lever, and a rocking lever between said cam and toggle-lever, substantially as described.

9. In a can heading machine, a pattern cam, an oscillatory support, a slide carried by said support, a seaming roller carried by said slide, and a roller carried by said support and engaging said pattern cam, substantially as described.

10. In a can heading machine, a pattern cam, a seaming roller, a slide carrying said roller, an oscillatory support for said slide, and a toggle-lever for actuating said slide, substantially as described.

11. In a can heading machine, a seaming roller, a slide on which said roller is mounted, a toggle-lever for actuating said slide having an arm engaging said slide, a block engaging the other arm, and a yielding buffer engaging said block, substantially as described.

12. In a can heading machine, a seaming roller, a slide carrying said roller, a support for said slide, screws fixed to and projecting from said support, a bar mounted on said screws, and an adjusting screw carried by said slide and extending through said bar, substantially as described.

13. In combination with a two-part slide, a seaming roller carried by one of said parts, a toggle-arm pivoted to one part and another toggle-arm pivoted to the other part, and a toggle-finger for operating said toggle-arms, substantially as described.

14. In combination with a two-part slide, a seaming roller carried by one of said parts and an adjusting screw carried by the other part and means to operate said slide, substantially as described.

15. In a can-heading machine, in combination with a chuck, a rotatably and vertically movable can-supporting table, gearing for synchronously rotating said chuck and table, driving means, a clutch between chuck and driving means, said table normally out of engagement with said gearing, and means for throwing said clutch into operation and for moving the table into engagement with the gearing upon the raising of the table, substantially as described.

16. In a can-heading machine, a chuck and a vertically movable can-supporting table, means for positively rotating both table and chuck, seaming rollers, means to advance said rollers to their work, driving means and controlling means to connect said driving means to said chuck, table and advancing means, and a lever which simultaneously raises said table to position a can and actuates said controlling means to throw the mechanisms into operation, substantially as described.

17. In a can-heading machine, in combination with a vertically-movable can-supporting table, seaming rollers, driving means, a lever for raising said table to position a can, a rod connected with said lever, a cam controlling said rod, means for advancing the rollers to their work, and means whereby the advancing means and the table are simultaneously connected to the driving means by the raising of the table, said cam operating to release the table and advancing means when the can has been seamed, substantially as described.

18. In combination with a rotatable table, a rotary chuck, driving means, a clutch, a brake, and an operating member and means to raise said table, engage the clutch and release said brake by the actuation of said operating member, substantially as described.

19. In a can-heading machine, a rotatable can-seaming mechanism, an operating lever, a driving mechanism, a locking mechanism, a clutch mechanism, and a brake, in combination with a rocking arm connected to said lever and locking mechanism, an arm for operating said clutch and a connection between said locking mechanism, arm and clutch arm, a brake operating arm and a connection between said clutch operating and brake operating arm, substantially as described.

20. In combination with an operating lever, a driving mechanism, seaming rollers, a rotatable can table, means to connect said rollers and table to the driving means by the same movement of the lever, a can rotating mechanism a shaft, a cam on said shaft, having a depression, a swinging frame, a roller in said frame adapted to engage said cam, substantially as described.

21. In combination with a driving mechanism, a can rotating mechanism, a clutch between said mechanisms, comprising pivoted clutch shoes, toggle-arms connected to said shoes, a slide, a cam, said slide having means to bear on said cam, and a return spring for said slide, substantially as described.

22. In a can-heading machine, in combination with a chuck, a rotatable shaft on which said chuck is fixed, a driving pulley loosely surrounding said shaft, a clutch fixedly connected to said shaft, a brake wheel fixed directly on said chuck shaft, a brake engaging said wheel, a lever for releasing said brake and means for automatically applying the same, substantially as described.

In testimony whereof I have signed my name to this specification in presence of two witnesses.

JULIUS BRENZINGER.

Witnesses:
JAS. H. BLACKWOOD,
H. P. DOOLITTLE.